(12) United States Patent
Abe et al.

(10) Patent No.: US 6,679,698 B2
(45) Date of Patent: Jan. 20, 2004

(54) DIE CLAMPING APPARATUS

(75) Inventors: Yuji Abe, Kanagawa (JP); Hiroshi Ishibashi, Kanagawa (JP); Makoto Tsuji, Kanagawa (JP); Hiroshi Yokoyama, Kanagawa (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 250 days.

(21) Appl. No.: 09/891,605

(22) Filed: Jun. 27, 2001

(65) Prior Publication Data

US 2002/0018826 A1 Feb. 14, 2002

(30) Foreign Application Priority Data

Jun. 29, 2000 (JP) ........................................ 2000-195704

(51) Int. Cl.⁷ .......................... B29C 45/40; B29C 45/84; B22D 17/22
(52) U.S. Cl. ...................... 425/153; 164/153; 164/342; 164/347; 425/556; 425/593; 425/444
(58) Field of Search .................................. 425/151, 153, 425/444, 556, 589, 593; 164/152, 153, 342, 343, 347

(56) References Cited

U.S. PATENT DOCUMENTS 3,418,684 A * 12/1968 Collins ........................ 425/444
3,726,625 A *  4/1973 Rees ........................... 425/556
4,545,757 A * 10/1985 Romi ........................... 425/593

* cited by examiner

Primary Examiner—James P. Mackey
(74) Attorney, Agent, or Firm—Pillsbury Winthrop LLP

(57) ABSTRACT

A die clamping apparatus including a movable plate which is in connection with a pushing-out pin which is projected from and retracted to a moving die and which is held movably with respect to a moving die plate, a clamp member for obtaining a constraint of the movable member, an air cylinder and a hook member. Only a movement of the movable member is constraint by the air cylinder with respect to the moving die plate when the latter is moved in a die opening direction from a die opening limit position, so that a resultant relative movement between the movable plate and the moving die plate, which causes the pushing-out pin to be projected from the moving die, resulting in a removal of a molded product, while the constraint of the movable member prevents the moving die plate from being moved in the die closing direction when the moving die plate in the die opening limit position is under non clamping condition.

14 Claims, 16 Drawing Sheets

DIE CLAMPING APPARATUS

BACKGROUND OF THE INVENTION

1. Field of the Invention

The present invention relates to a die clamping apparatus with an ejecting mechanism for separating molded articles from a die assembly, which may be used for a die-casting machine or a plastic injection molding machine.

2. Description of the Related Art

In an injection molding machine for molding a resin material such as a plastic material, a die clamping apparatus for a die assembly is provided, which die clamping apparatus is provided with an ejector or pushing-out mechanism for detaching a molded article from the die assembly. The die clamping apparatus is for closing and opening a die assembly. At the closed condition by the die clamping apparatus, the die assembly is subjected to a clamping operation at a desired clamping force in the die assembly. The ejector mechanism in the die clamping apparatus is provided with ejector pins, which are selectively projected into a cavity formed by the die assembly. Namely, when the die assembly is opened as the result of a completion of a molding process, the ejector pins are projected into the cavity, thereby causing a finished product to be removed.

In a prior art construction, an ejector pin of an ejecting mechanism and the die are separately operated by different actuators. Thus, the prior art construction is defective in that a construction is complicated and a cost is increased.

SUMMARY OF THE INVENTION

An object of the present invention is to provide a die apparatus capable of overcoming difficulties in the prior art.

Another object of the present invention is to provide a die apparatus capable of obtaining a positive operation of a pushing-out operation in relation to the opening/closing operation of the die clamping apparatus.

According to a first aspect of the invention, a die apparatus is provided, comprising: a stationary die; a stationary die plate on which the stationary die is held; a moving die; a moving die plate on which the moving die is held while the moving die being faced with the stationary die; die clamping means for selectively opening and closing the dies as well as for clamping the dies; at least one pushing-out pin selectively projected from and retracted to the moving die; a movable member connected to the pushing-out pin and arranged movably with respect to the moving die plate, and; means for constraining the movement of the movable member in the die opening and closing directions when the movable member is moved to a predetermined die opening position, such that, with respect to the moving die plate moved further in the die opening direction from the predetermined die opening position or moved in the die closing direction toward the die opening position, only the movement of the movable plate is constrained by the constraining means.

In the operation of the first aspect of the invention, the movement of the movable member connected to the pushing-out pin in the die opening direction is constrained by the constraining means when the moving die plate is moved to the die opening position. A further movement of the moving die plate in the die opening direction from the die opening position allows only the movement of the moving die plate, while the movable member to be kept stopped. As a result, a relative movement is obtained between the movable member and the moving die plate, which cause the pushing-out pin to be projected from the moving die, which causes a product to be separated.

After the completion of the ejection of the product, the moving die plate is returned to the die opening position in the die closing direction. During the movement, the movable member is also constrained by the constraining means. As a result, the pushing-out pin connected to the movable member is retracted to the die surface of the moving die. Namely, in the present invention, a retraction of the pushing-out pin to the moving die is not done by a spring force as is the case in the prior art but is done by the movement of the moving die itself. Thus, a reliable retraction of the pushing-out pin to a predetermined position can be obtained even in a situation where a desired function of a return spring is lost under a reason that molten metal is attached and solidified to the coil spring.

According to a second aspect of the present invention, a die apparatus is provided, which comprises: a stationary die; a stationary die plate on which the stationary die is held; a moving die; a moving die plate on which the moving die is held while the moving die being faced with the stationary die; die clamping means for selectively opening and closing the dies as well as for clamping the dies; at least one pushing-out pin selectively projected from and retracted to the moving die; a movable member connected to the pushing-out pin and arranged movably with respect to the moving die plate; means for constraining the movement of the movable member in the die opening and closing directions when the movable member is moved to a predetermined die opening position, such that, with respect to the moving die plate moved further in the die opening direction from the predetermined die opening position, only the movement of the movable plate is constrained by the constraining means, thereby generating a resultant relative movement between the movable member and the moving die plate, so that the pushing-out pin is projected from the moving die, which causes a molded product to be pushed out, and; means for preventing the moving die plate from being moved at least in the forward direction from the die opening position after the completion of the pushing-out operation for a separation of a molded product so long as the constraining operation by the constraining means is maintained.

In this second aspect of the invention, the die clamping means comprise a link housing and drive means arranged between the link housing and the moving die plate for generating a die clamping force, and wherein the constraining means constrains the movable member with respect to the to the link housing.

In the second aspect of the invention, the constraining means comprise an actuator mounted on one of the link housing and the moving die plate for causing the link housing and the moving die plate to be engaged with each other.

In the operation of the second aspect of the invention, the movement of the movable member connected to the pushing-out pin in the die opening direction is constrained by the constraining means when the moving die plate is moved to the die opening position. A further movement of the moving die plate in the die opening direction from the die opening position allows only the movement of the moving die plate, while the movable member to be kept stopped. As a result, a relative movement is obtained between the movable member and the moving die plate, which cause the pushing-out pin to be projected from the moving die, which causes a product to be separated from the moving die.

When the moving die plate is in the die opening position, the movable member is constrained by the constraining means and the moving die plate is prevented from being moved with respect to the movable member from the home position in the die closing direction, so that the moving die plate is prevented from being moved from the die closing direction from the die opening direction so long as the constraining means is operated. Thus, the present invention can function as a safety mechanism which prevents the die apparatus from being accidentally closed.

According to a third aspect of the present invention, a die apparatus is provided, which comprises: a stationary die; a stationary die plate on which the stationary die is held; a moving die; a moving die plate on which the moving die is held while the moving die being faced with the stationary die; die clamping means for selectively opening and closing the dies as well as for clamping the dies; at least one pushing-out pin selectively projected from and retracted to the moving die; a movable member connected to the pushing-out pin and arranged movably with respect to the moving die plate; urging means for urging the movable member with respect to the moving die plate movable so that a position is obtained, where the pushing-out pin is held in positions retracted into the moving die plate, and; means for constraining the movement of the movable member in the die opening and closing directions when the movable member is moved to a predetermined die opening position, such that, with respect to the moving die plate moved further in the die opening direction from the predetermined die opening position, only the movement of the movable plate is constrained by the constraining means, so that a resultant relative movement between the movable member and the moving die plate causes the pushing-out pin to be projected from the moving die, which causes a molded product to be pushed out, while the constraint of the movable member being kept until the moving die plate is returned to the die opening position.

In the third aspect of the invention, the preventing means comprise stoppers arranged between the movable member and the moving die plate for preventing a relative movement of the die plate with respect to the movable plate in die closing direction from a prefixed relative position between the movable member and the moving die plate, whereby under the constraining operation of the constraining means, the movement of the moving die plate in the die closing direction is prevented.

In the third aspect of the invention, the die clamping means comprise a link housing and drive means arranged between the link housing and the moving die plate for generating a die clamping force.

In the third aspect of the invention, a die apparatus further comprises means for preventing the moving die plate from being moved at least in the forward direction from the die opening position so long as the constraining means is not released.

In the third aspect of the invention, the constraining means comprise an engaging member mounted on one of the link housing and the moving die plate, and actuating means for causing the engaging member to be selectively engaged with the other of the link housing and the moving die plate.

In the die apparatus in the third aspect of the invention, the movable member connected to the pushing-out pin is constrained in its movement in the die opening and closing directions by the constraining means when the moving die plate is moved to the predetermined die opening condition. When a further movement of the moving die plate in the die opening direction from the die opening position is obtained, only the moving die plate is moved, while the movable member is kept stopped. As a result, a relative movement is obtained between the movable member and the moving die plate, which causes the pushing-out pin to be projected from the moving die, resulting in a detachment of the obtained product.

Upon the completion of the pushing-out operation of the molded product, the constraining operation of the movable member is kept until the moving die plate is returned to the predetermined die opening position. Thus, upon the completion of the return to the predetermined die opening position, a positive return of the movable member to the home position with respect to the moving die plate is obtained. Thus, at the returned condition of the moving die plate to the die opening position, the pushing-out pin is positively prevented from being projected from the moving die.

According to the fourth aspect of the invention, a die apparatus is provided, comprising: a stationary die; a stationary die plate on which the stationary die is held; a moving die; a moving die plate on which the moving die is held while the moving die being faced with the stationary die; die clamping means for selectively opening and closing the dies as well as for clamping the dies; at least one pushing-out pin selectively projected from and retracted to the moving die; a movable member connected to the pushing-out pin and arranged movably with respect to the moving die plate; first constraining means for preventing the movable member from being moved from a home position with respect to the moving die plate; second constraining means for preventing the movable member from being moved in the die opening and closing directions when a when the movable member is moved to a predetermined die opening position; the arrangement of the first and second constraining means being such that, with respect to the moving die plate moved further in the die opening direction from the predetermined die opening position, only the movement of the movable plate is constrained by the second constraining means, so that a resultant relative movement between the movable member and the moving die plate causes the pushing-out pin to be projected from the moving die, which causes a molded product to be pushed out and such that, except for a condition where the relative movement is to be obtained, the movable member is always constrained the first constraining means.

In the third aspect of the invention, the die clamping means comprise a link housing and drive means arranged between the link housing and the moving die plate for generating a die clamping force, and wherein the second constraining means constrains the movable member with respect to the link housing.

In this fourth aspect of the invention, a die apparatus further comprises means for preventing the moving die plate from being moved in the forward direction from the die opening position so long as the constraining operation by the second constraining means is not released.

In the fourth aspect of the invention, the first and second constraining means are integrated such that a selective operation is obtained between the constraint of the movable member from the home position with respect to the moving die plate and the constraint of the movable member to the die opening and closing direction after the movement to the predetermined die opening position is obtained.

In the fourth aspect of the invention, the first constraining means are arranged on one of the moving die plate and the movable member and having an actuator for causing the moving die plate and the movable member to be engaged with each other, and wherein the second constraining means are arranged on one of the link housing and the moving die plate, and having an actuator for causing the link housing and the moving die plate to be engaged with each other.

In the operation of the fourth aspect of the invention, the movable member connected to the pushing-out pin is constrained by the first constraining means until the moving die plate is moved to the predetermined die opening position. Thus, a home position of the movable member with respect to the moving die plate is reliably obtained. When the movable member is moved to the predetermined die opening position, a constraint by the second constraining means is obtained in the die opening and closing directions. Prior to the commencement of the relative movement between the movable member and the moving die plate, a constraint by the first constraining means is released, which allows a relative movement between the movable member and the moving die plate, which causes the pushing-out pin to be projected from the moving die, resulting in a separation of the molded product the moving die.

When the return of the moving die plate to the predetermined die opening position is completed after the completion of the pushing-out operation of the molded product, the movable member is positively returned to a home position with respect to the moving die plate. Thus, the movable member is prevented from being moved from the home position, thereby preventing the die clamping operation from being executed under the projected condition of the pushing-out pin from the moving die.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Now, a problem to be solved by a present invention will be explained with reference to FIG. 16, which illustrates a technique in a Japanese Examined Patent Publication (Kokoku) No.4-241, wherein an opening-closing operation of the die set as well as an operation of the ejector device are executed by one and the same actuator.

Figure 16:
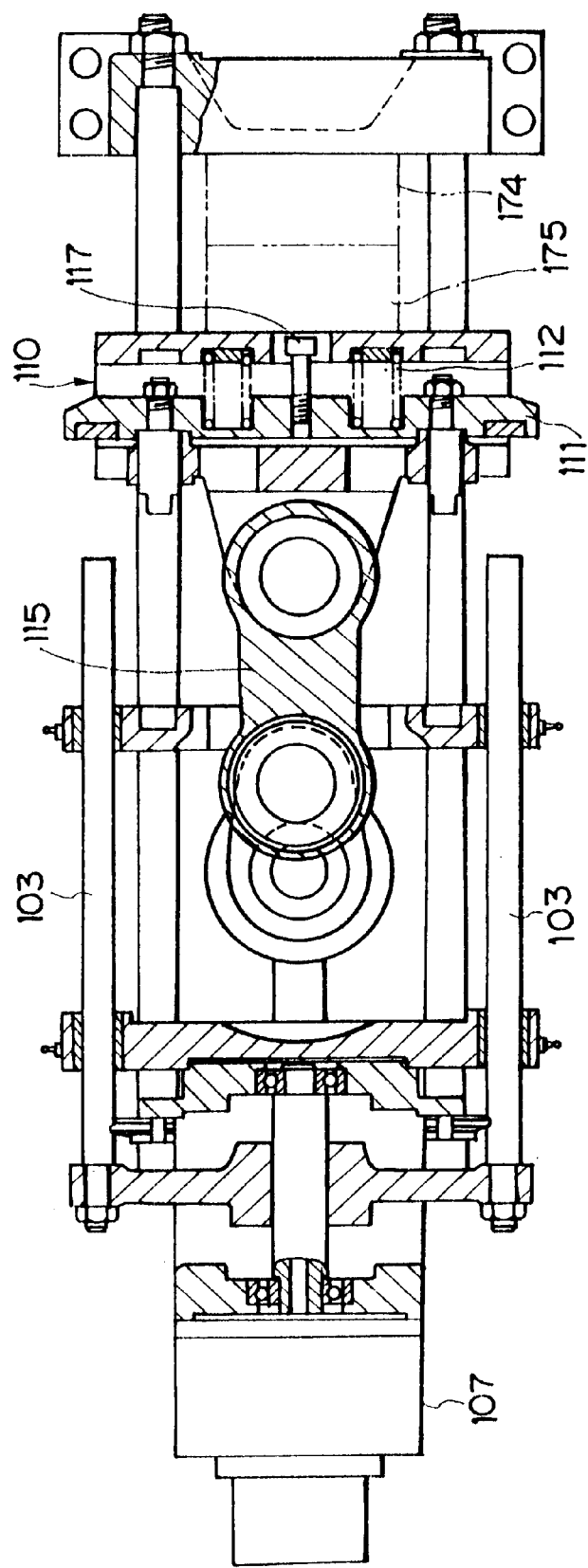
FIG. 16 is a view illustrating a construction in the prior art.

As shown in FIG. 16, the die clamping apparatus disclosed in No.4-241, a mechanism is provided, by which a stationary die 174 is clamped to a moving die 175 and by which, after the execution of an injection molding followed by cooling, the moving die 175 is detached from the stationary die 174 by means of a moving die plate 110 while a product is removed by an ejecting pins 117. In more detail, the mechanism is constructed by a crank arm 115 for a reciprocating movement of the moving die plate 110, a motor 107 for driving the crank arm 115, a pushing-out plate 111 arranged inside of the moving die plate 110 and urged by a spring 112 for a rearward movement, and ejecting bars 103 for causing, upon a retraction of the ejecting plate 111 to a predetermined position, the ejecting bar 103 to be, at its end, contacted with the ejecting plate 111, thereby preventing any additional retraction of the ejecting bar.

In this clamping apparatus, when the crank arm 115 is driven to cause the die plate 110 to be moved for opening the moving die 175, the ejecting plate 111 is contacted with the ejecting bar 103, thereby preventing a further retraction of the ejecting plate 111. A further retraction of the die plate 110 with the ejecting plate 111 as stopped causes the spring 112 to be subjected to a compression, so that the ejecting pin 117 is projected with respect to the moving die 175. As a result, the product is removed from the moving die 175. When the crank arm 115 is driven so that the moving die plate 110 is forwardly moved, the ejecting plate 111 is spaced from the ejecting bar 103. As a result, the ejecting pin 117 is retracted into the moving die 175 under the force of the spring 112, thereby returning back to a home position.

It would be possible that above mentioned prior art clamping apparatus provided with a pressing mechanism operating an injecting pin 117 in association with an opening/closing operation of a die set in the plastic injection machine is applied to a die casting machine. However, in the die casting machine, a melt of a metal such as an aluminum alloy as a molding material is used. As a result, it is likely that a part of molten metal injected into the die set is flown to the die plate 110 and is attached to a spring 112 arranged in the moving die plate 110. These molten metal attached to the spring is finally solidified, so that a situation may be arisen that the spring 112 can not be desirably expanded. In such a situation, the ejector pin 117 moved with respect to the moving die plate 110 is prevented from being returned to the desired position. Namely, at the closed condition of the moving die with respect to the stationary die after the execution of the ejecting operation of the molded product, it may be possible that the ejector pin 117 is projected to the moving die 175. When a molding is done at the condition that the ejector pin 117 is projected to the moving die 175, the molding can not be desirably done. In particular, when a molding is done under a condition that a core is inserted to the die set, the ejector pin 117 as projected causes the die set to be likely damaged.

Now, embodiments of the present invention overcoming the above difficulties in the prior art will be explained with reference to attached drawings. In other words, the present invention aims to obtain a reliable operation of a pushing-out pin in relation to a die opening or closing operation.

First Embodiments

Figure 1:
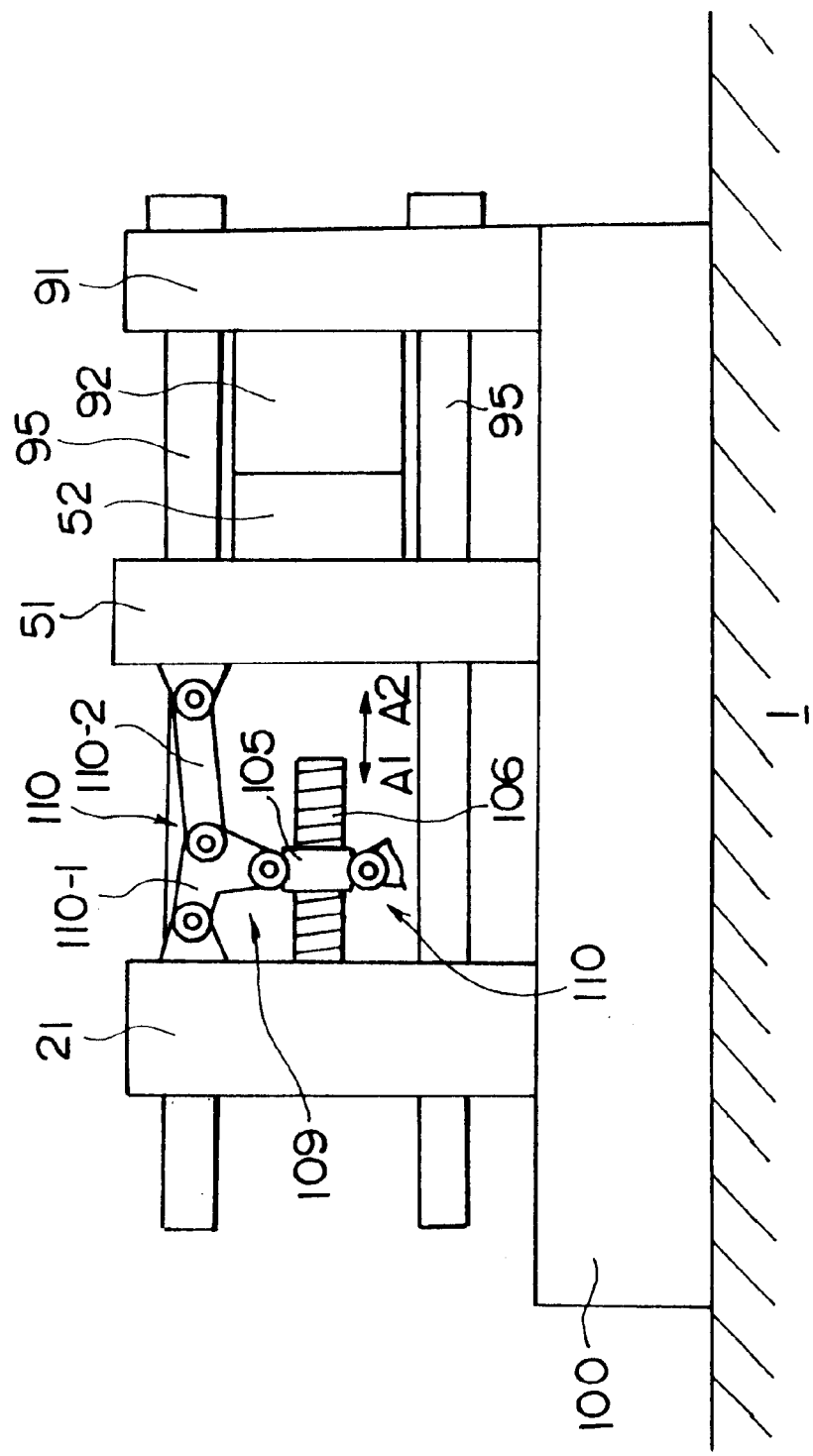
FIG. 1 is an entire schematic view of a die apparatus according to the present invention when it is at a die closing condition.

FIG. 1 shows an example of a construction of a die clamping apparatus 1 according to the present invention. The die clamping apparatus 1 in FIG. 1 is used for a clamping for a die-casting machine.

In FIG. 1, the die clamping apparatus 1 is constructed by a base 100, a stationary die plate 91 on the die base 100, a stationary die 92 on the stationary die plate 91, a moving die plate 51 faced with the stationary die plate 91 and movable on the base 100, a moving die 52 faced with the stationary die 91 and mounted to the moving die plate 51, a link housing 21 connected to the stationary die plate 91 by means of tie bars 95 while the moving die plate 51 is arranged between the stationary die plate 91 and the link housing 21, and a toggle type clamping mechanism 109 for connecting the link housing 21 with the moving die plate 51.

The stationary die plate 91 is fixedly connected to the base. The link housing 21 is, normally, fixed to the tie bars 95. However, a movement of the link housing 21 is possible when an adjustment of die height as caused by a die exchange is done. The moving die plate 51 is mounted movably on the base 100. The link housing 21 and the stationary die plate 91 are connected with each other by means of the tie bars 95 passed through the moving die plate 51. The tie bars 95 of a number of 4 are usually used.

The toggle die clamping mechanism 109 for connecting the link housing 21 with the moving die plate 51 include a pair of link system 110, only one of which is shown in detail. Each of the toggle mechanisms 110 is constructed by an angled first link 110-1 and a straight link 110-2. The first link 110-1 has a first end pivoted to the link housing 21 and a second end pivoted to a cross head 105. The second link 110-2 has a first end pivoted to the first link 110-1 at a location between the pivot points to the link housing 21 and the cross head 105 and a second end pivoted to the moving die plate 51.

The cross head pivoted to the first link 110-1 of the toggle mechanism 109 is moved in a direction as shown by an arrow A1 or A2 along the screw shaft 106, which causes the toggle mechanism to be operated, so that the link housing 21 is moved to or moved away from the moving die plate 51. The screw shaft 106 is, as will described later, operated by a servomotor arranged in the link housing 21. Namely, as a result of the rotating movement of the screw shaft 106, the cross head 105 in a screw engagement with the screw shaft 106 is moved in the direction as shown by the arrow A1 or A2.

As shown in FIG. 1, the movement of the cross head 105 in the direction as shown by the arrow A2 causes the toggle mechanism 109 to be operated, so that the moving die plate 51 is moved in the direction away from the link housing, i.e., in the die closing direction, resulting in a closure of the moving die 52 with respect to the stationary die 92. Further movement of the cross head in the direction of the arrow A2 causes tie bars 95 to be tensioned, resulting in a clamping of the moving die 52 with respect to the stationary die 92.

Under the clamping state between the moving die 52 and the stationary die 92, to a cavity therebetween, a molten metal such as a aluminum alloy from a not shown injection device is injected, so that the material is filled to the cavity, thereby obtaining die casting products.

In order to take out the die casting product, the moving die 52 is opened. Namely, in FIG. 2, the movement of the cross head 105 in the direction as shown by the arrow A1 causes the moving die plate 51 to be moved in the direction toward the link housing 21, i.e., the die opening direction, by means of the link systems 110 of the toggle mechanism 109, so that the moving die 52 is opened with respect to the stationary die 92. In this case, a pushing-out mechanism, which will fully explained later, pushes out the product located in the moving die 52.

Figure 3:
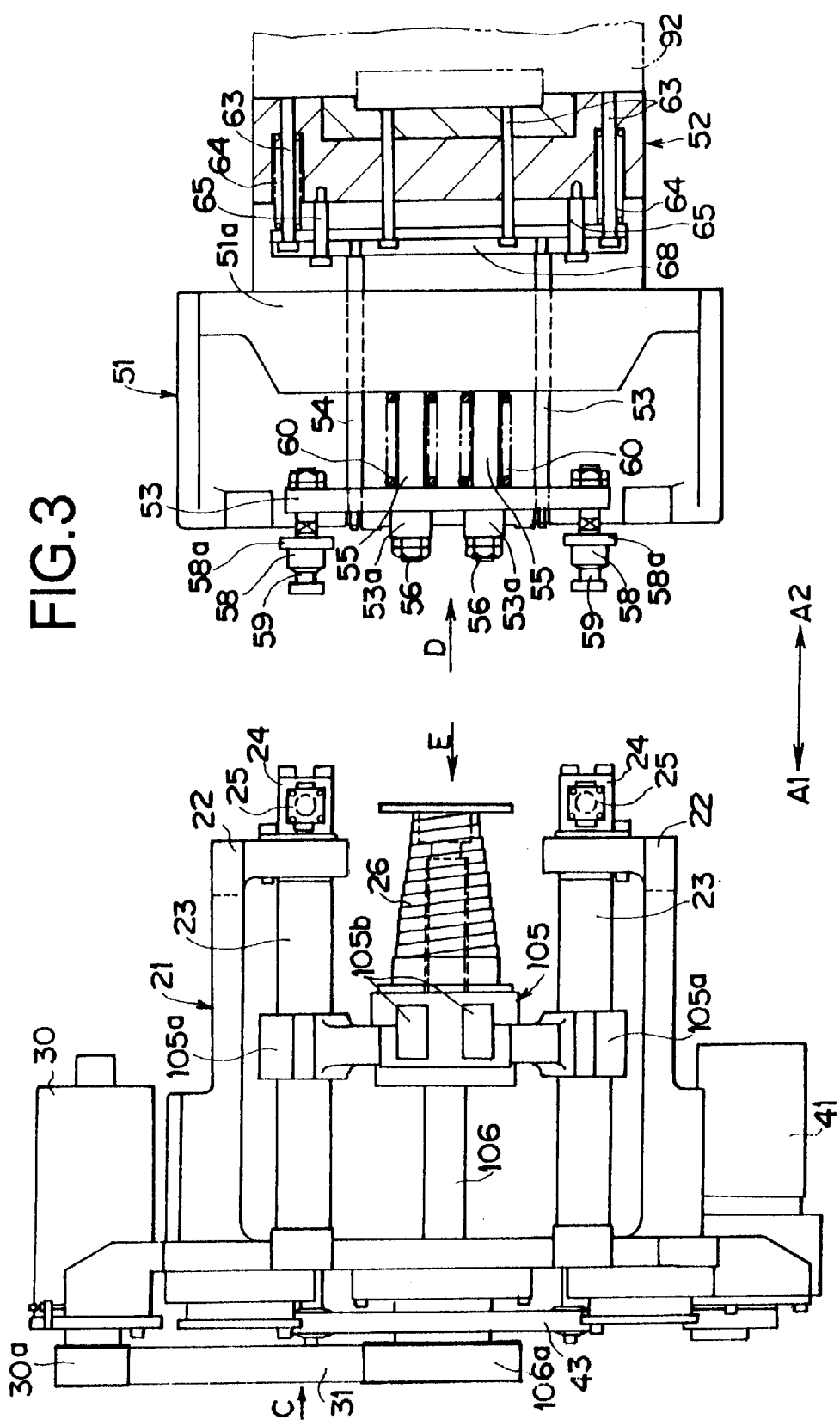
FIG. 3 is a enlarged, detailed plan view of the apparatus in a first embodiment of the present invention focused to an arrangement around a link housing and a moving die plate, in which moving die plate is in its die closing position.
Figure 4:
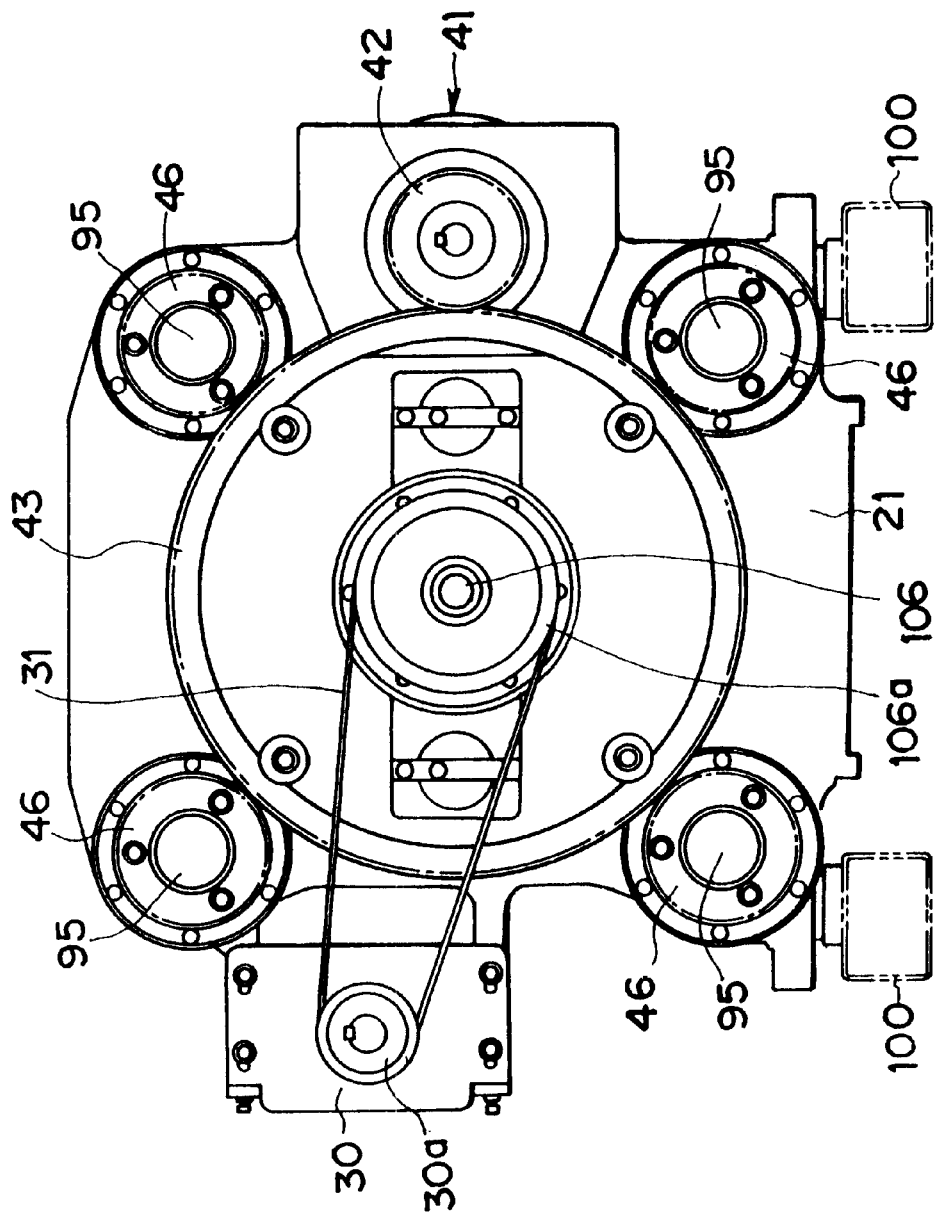
FIG. 4 is a rear elevational view of link housing taken along an arrow C in FIG. 3.
Figure 5:
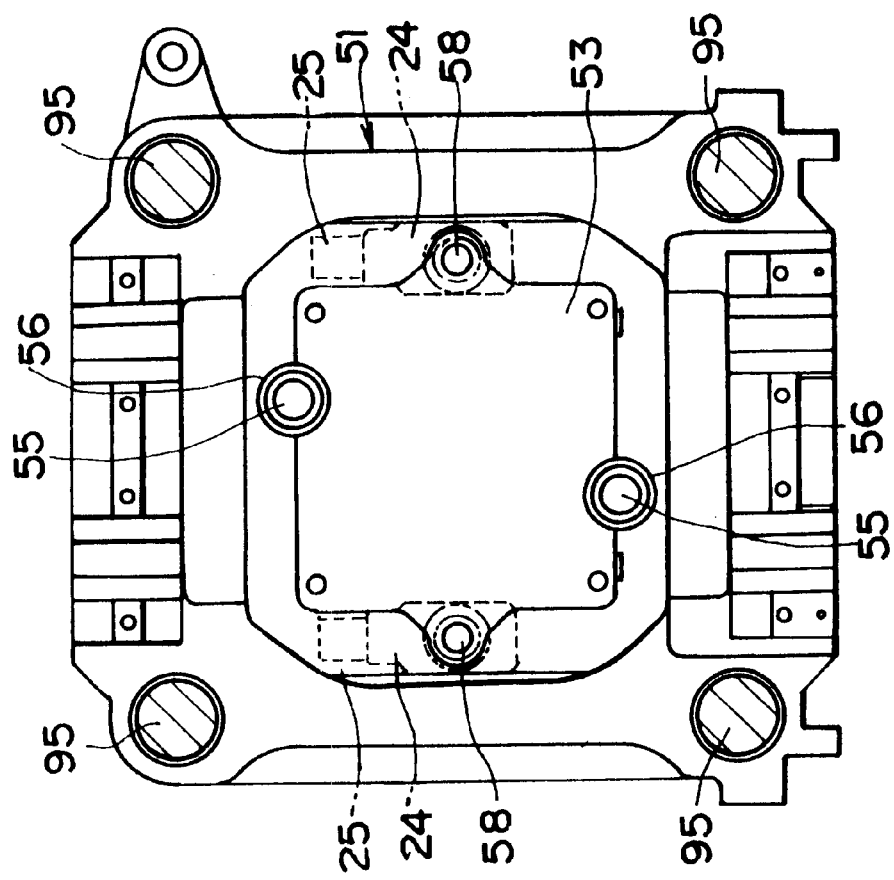
FIG. 5 is a partially sectioned rear elevational view of a moving die plate taken along an arrow D in FIG. 3.
Figure 6:
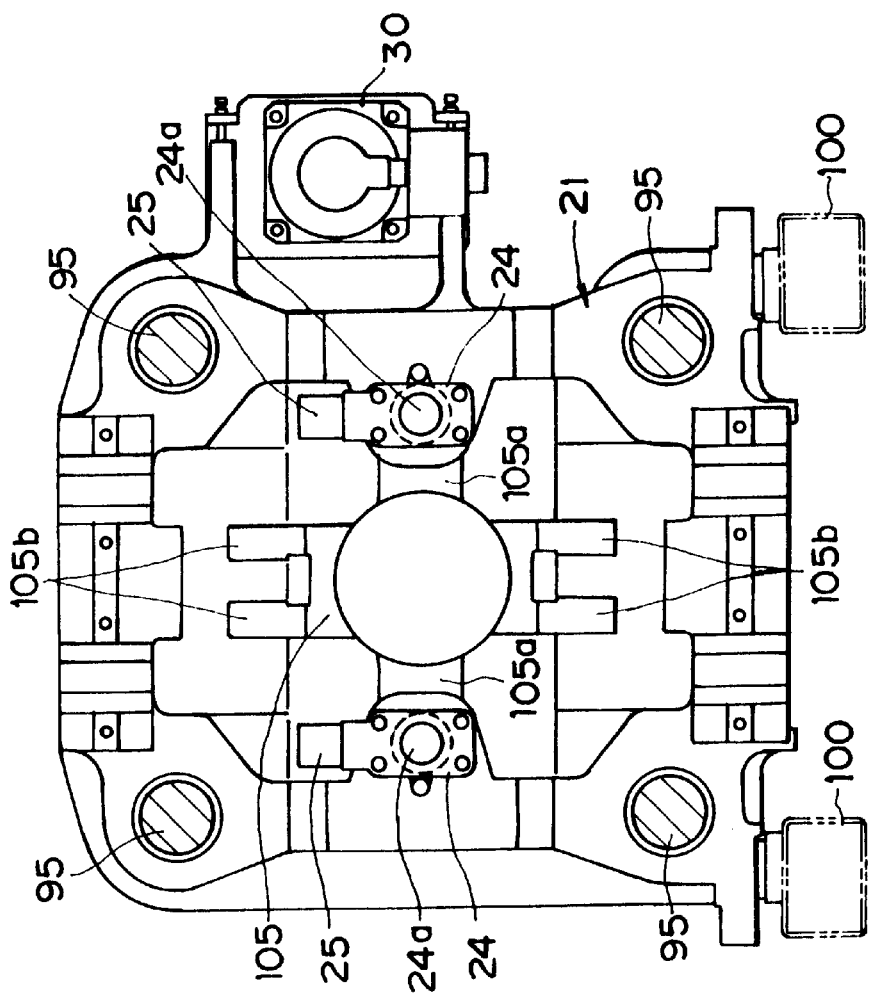
FIG. 6 is a partially sectioned front elevational view of a link housing taken along an arrow E in FIG. 3.

FIG. 3 is a plan view of a construction around the link housing 21 and the moving die plate in the clamping apparatus according to an embodiment of the present invention. FIG. 4 is a rear view of a link housing 21 taken along a line C in FIG. 3. FIG. 5 is a rear view of the moving die plate 51 taken along a line D in FIG. 3. FIG. 6 is a front view of the link housing 21 In FIG. 3, a servo motor 30 for a clamping operation and a motor 41 for adjusting a die height are, respectively, arranged on sides of the link housing. Furthermore, as shown in FIG. 4, the servo-motor 30 has an output shaft on which a pulley 30a is connected. On the other hand, the die height adjusting motor 41 has an output shaft on which a gear 42 is fixed. As shown in FIGS. 3 and 4, the link housing 21 is, at its center, provided with a screw shaft 106 which is rotatable and extends parallel to the die opening/closing direction A1 or A2. The screw shaft 106 has an end, to which a pulley 106a is fixedly connected. As shown in FIG. 4, a toothed belt 31 are looped between the pulley 106a on the screw shaft and the pulley 30a on the output shaft of the clamping servo-motor 30, so that the rotating movement of the servo-motor 30 is transmitted to the screw shaft 106.

A ring gear 43 is rotatably supported to the link housing 21 at its rear side so that the ring gear 43 is coaxial with respect to the screw shaft 106. The ring gear 43 is in a meshing engagement with the gear 42 fixed to the output shaft of the die height adjusting motor 41.

Rotatable y supported to the housing at its four corners, respectively, are tie bar nuts, each of which is in a screw engagement with a screw thread portion of the respective tie bar. Each of the tie bar nut forms, at its outer periphery, a gear wheel part, which is in a meshing engagement with the ring gear 43.

The rotating movement of the die height adjusting motor 41 is, via the gear 42 and the ring gear 43, transmitted to the tie bar nuts 46, which causes the link housing 21 to be moved along a direction parallel to the axes of the tie bars 95.

The term ie height throughout the specification refers a distance between the moving die plate 51 and the stationary die plate 91 under a condition that the moving die 52 contacts with the stationary die 92 without generating no clamping force between these dies 52 and 92. In accordance with the height of the moving die 52 and the stationary die 92, the position of the link housing 21 is adjusted, by which an adjustment of the die height can be done.

In FIG. 3, the screw shaft 106 is under a screw engagement with the cross head 105. As a result, the a rotating movement of the screw shaft 106 causes the cross head 105 to be moved in the die opening/closing direction A1 or A2.

The cross head 105 has side portions 105a, to which guide bars 23 are slidably inserted. The guide bars 23 are connected to the link housing 21 while extending in a direction parallel to the die opening/closing direction A1 or A2. The guide bars 23 are, at their rear ends, fixedly connected to the link housing 21. From the link housing 21, supporting parts 22 extend parallel to the die opening/closing direction A1 or A2, which support the front ends of the guide bars 23.

As shown in FIGS. 3 and 6, the cross head 105 is, at its top and bottom portions, formed with connecting parts 105b, which are connected to the links 110-1 of the toggle mechanism 109 which is adapted for connecting the moving die plate 51 and the link housing 21 with each other.

A stretchable cover 26, which encircles the screw shaft 106 is arranged between the end of the screw shaft 106 and the cross head 105. The cover 26 functions to prevent any foreign matter such as splash of melt from being attached to the screw shaft 106.

As shown in FIGS. 3 and 6, a clamp member 24 is provided on the front end of each of the supporting parts of the link housing 21. Each of the clamp members 24 is formed with an insertion hole 24a which extends in the direction parallel to the die opening/closing direction A1 and A2. At the upper part of each of the clamp members 24, an air cylinder is provided, which is an embodiment of an actuator according to the present invention. The air cylinder 25 is provided therein with a piston rod, which is capable of projected into or removable from the insertion hole 24a of the clamp member 24. Furthermore, the arrangement of each air cylinder 25 is such that its piston rod extends in a direction perpendicular to the central axis of the insertion hole 24a.

The moving die plate 51 has a movable plate 53 at location opposite to the side where the moving die 52 is held. The movable plate 53 is an embodiment of a movable member in the invention as claimed. As shown in FIGS. 3 and 5, the movable plate 53 is held by guide rods 55, so that the movable plate 53 is moved in the die opening or closing direction A1 or A2. The guide rods 55 are mounted to side surface of a body 51a of the moving die plate 51, so that the guide rods 55 extend vertically to the surface of the body 51a of the moving die plate 51. The movable plate 53 is, at its one of side surfaces, insertion parts 53a, to which the guide rods 55 are, respectively, inserted. At tip end of each of the guide rods 55, a stopper 56 formed as doubled nuts is fixedly connected. The stopper 56 prevents the movable plate 53 from being withdrawn.

A coil spring 60 is inserted to each of the guide rods 55 in such a manner that the coil spring is arranged between faced surfaces of the movable plate 53 and the moving die plate 51. The coil spring 60 is an example of an urging means of the invention as claimed.

The coil spring 60 urges the movable plate 53 in the die closing direction A1 under the resilient force of the spring. Namely, under such an elastic urging force, the movable plate 53 is held at a limit position in a movement in the die opening direction A1, where the movable plate 53 is in contact with the stopper 56. This contact position of the movable plate 53 contacting with the stopper 56 is a home position of the movable plate 53, where the pushing-out pin 63 is just retracted from the die surface of the moving die 52.

At the surface of the movable plate 53 faced with the link housing 21, hook members 58 are provided, which are adapted for an insertion to the insertion holes 24a of the clamping members 24, which are arranged at the tip ends of the supporting parts 22 of the link housing 21. The hook members 58 are arranged so as to face the corresponding clamping members 24. The hook member 58 is formed with a catching recess 59, with which the tip end of the piston rod of the corresponding air cylinder 25 is engaged. The hook member 58 has a stopper portion 58a formed as a flange on the hook member. The stopper portion 58a functions to determine the position of the hook member 24 with respect to the clamping member 24 when the free end of the hook member 58 is inserted to the insertion hole 24a of the clamping member 24. The air cylinder 25, the clamping member 24 and the hook member 58 construct constraining means in the claimed invention.

The moving die 52 is provided with a plurality of pushing-out pins 63 in such a manner that the pushing-out pins 63 are projected or retracted from the die surface of the moving die 52. These pushing-out pins 63 are connected to a pushing-out plate 68 arranged at the rear side of the moving die 52. The pushing-out plate 68 is movably held in the die opening or closing direction A1 or A2 by means of guide pins 65 arranged at the rear side of the moving die 52.

A plurality of coil springs 64 are arranged between the pushing-out plate 68 and the moving die 52, so that the coil springs generates a force which causes the pushing-out plate 68 to be spaced from the moving die 52. The pushing-out plate 68 is connected to the movable plate 53 by means of connecting rods 54 which are passed through the moving die plate 51. Due to the fact that the movable plate 53 and the pushing-out plate 68 are connected with each other by means of the connecting rods 54, the movable plate 53 and the pushing-out pins 63 are under a mutually connected condition, so that, in association with the relative movement of the movable plate 53 with respect to the moving die plate 51, the pushing-out pins 63 are projected or extracted from the die surface of the moving die 52.

Now, an operation of the die clamping apparatus as constructed above will now be explained.

Figure 2:
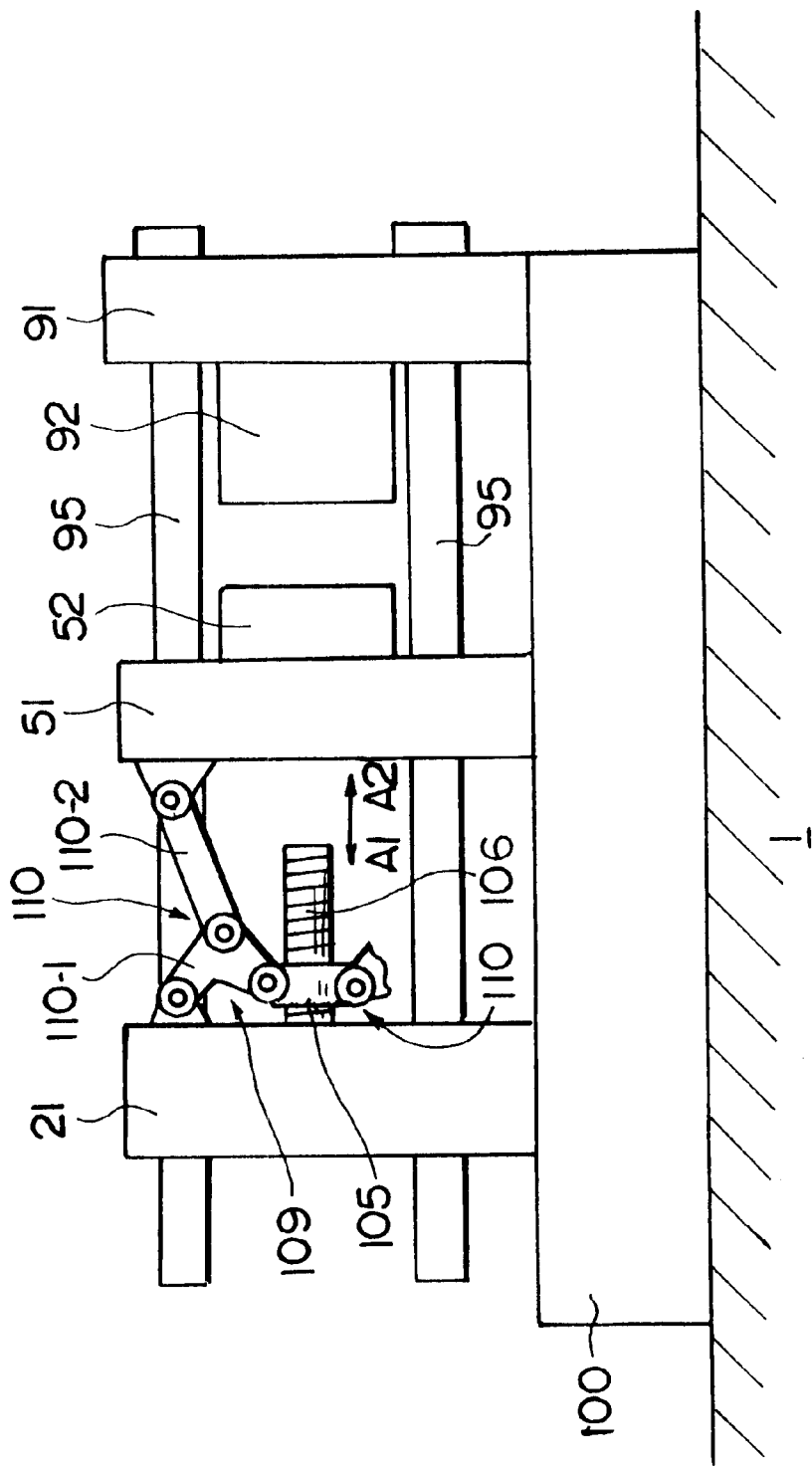
FIG. 2 is the apparatus in FIG. 1 when it is at a die opening condition.
Figure 7:
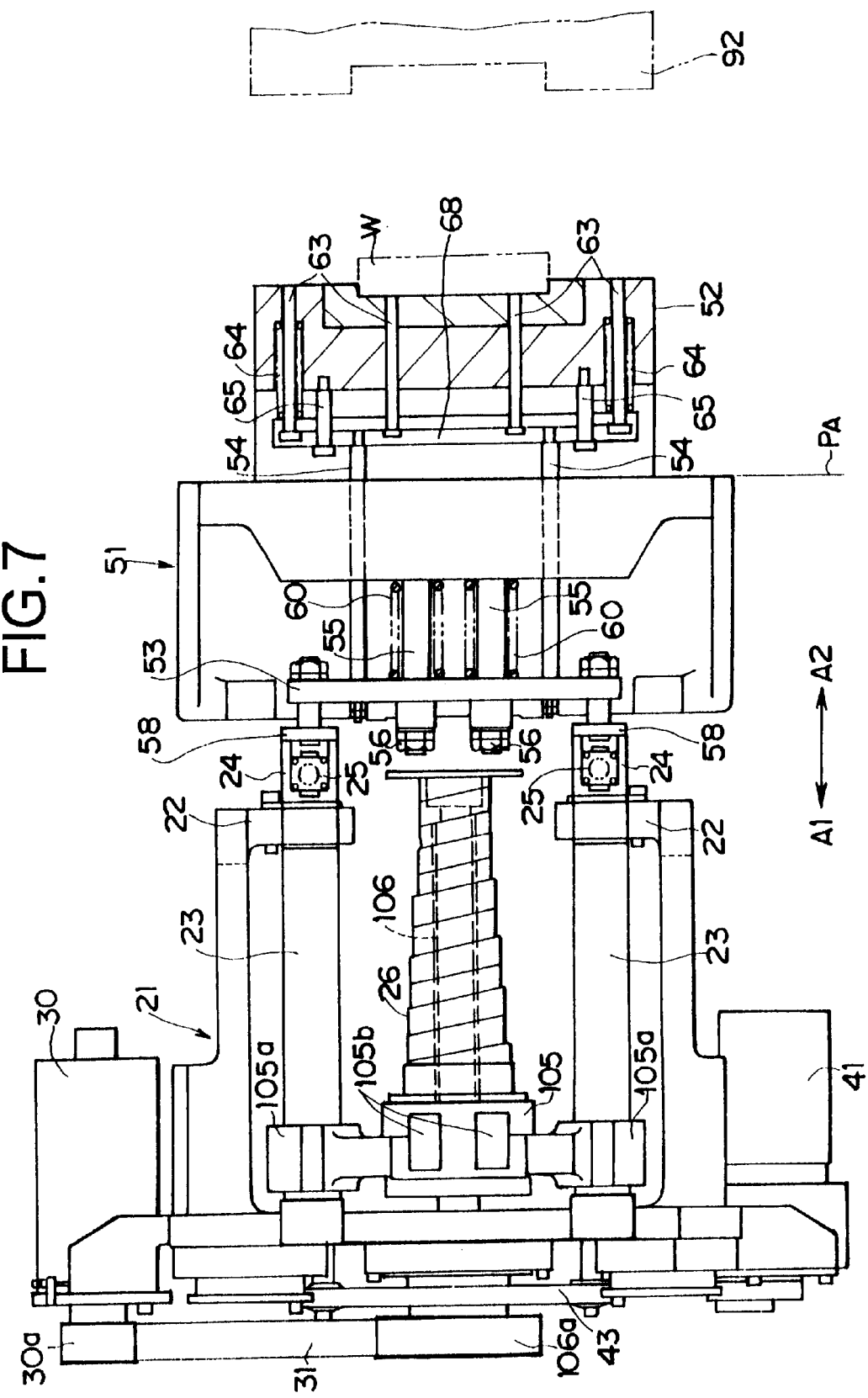
FIG. 7 is the same as to FIG. 3 except that the moving die plate 51 is moved to a die opening limit position PA.

The clamping apparatus 1 shown in FIG. 3 is a condition where the moving die 52 is clamped with respect to the stationary die 92. From this condition, the clamping servo-motor 30 is operated, so that the servomotor 30 is rotated in a desired direction, which causes the cross head 105 to be moved in the die opening direction. During such a movement of the cross head in the die opening direction A1, the above mentioned toggle mechanism 109 causes the moving die plate 51 to be moved toward the link housing 21 as shown in FIG. 2, so that the moving die 52 is opened with respect to the stationary die 52, as shown in FIG. 7. In this case, a die casting product W as formed in the cavity formed by the stationary die 92 and the moving die 52 is moved together with the moving die 52 as shown in FIG. 7.

When the moving die plate 51 is moved to a predetermined die opening position, i.e., the die opening limit position PA in the die opening direction, the hook members 58 of the movable plate 53 are inserted to the respective insertion holes 24a of the clamp members provided in the link housing 24. As a result, the movable plate 53 are in connection with the link housing 21 by way of the clamp members 24 and the hook members 58.

Figure 9:
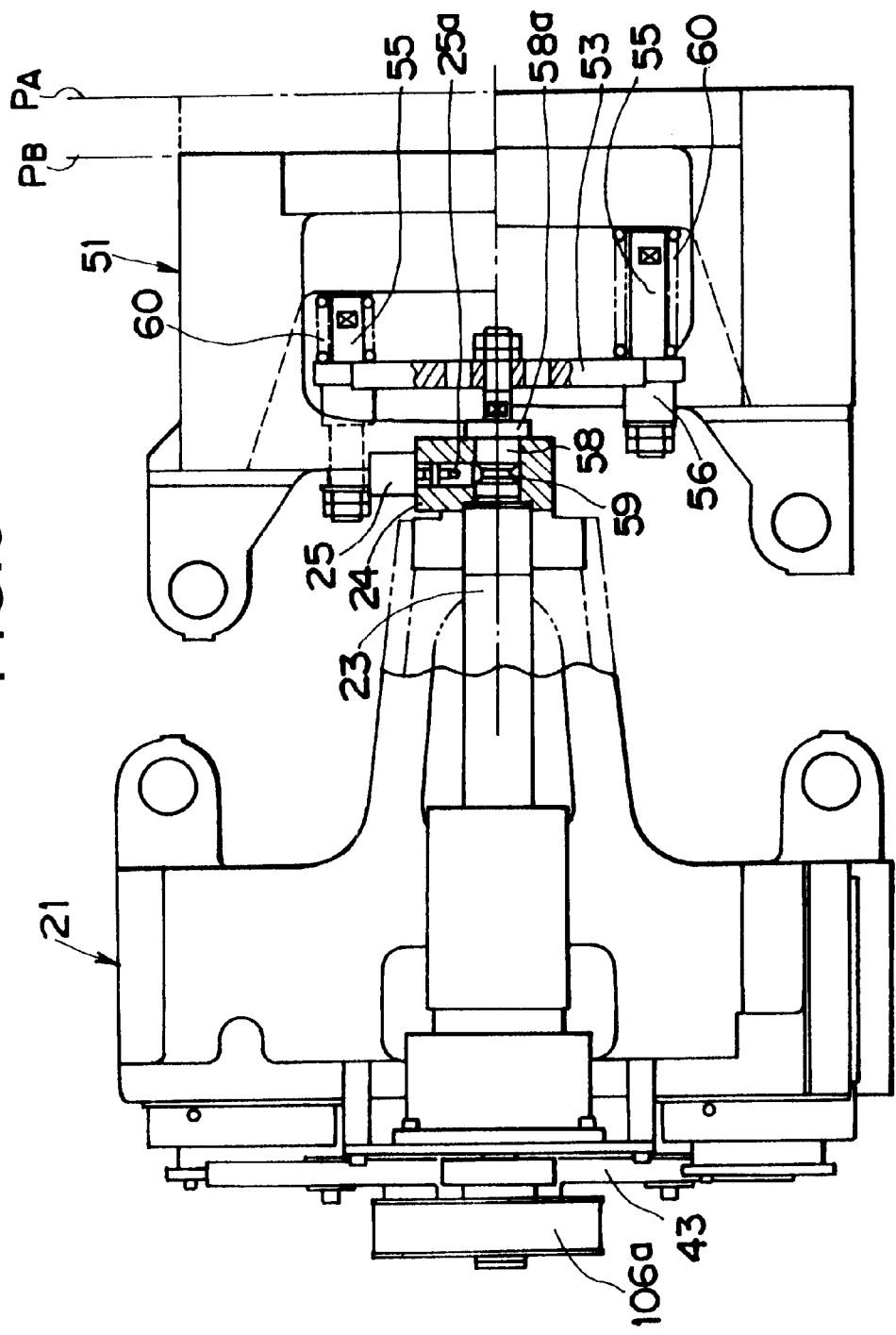
FIG. 9 illustrates a side view of the link housing and a movable plate when the latter is clamped by the link housing.

FIG. 9 illustrates a side view of the link housing 21 and the moving die plate 51 at a condition where the moving plate 52 is clamped to the link housing 21. In FIG. 9, the lower half illustrates that the moving die plate 51 is moved to the die opening limit position PA.

When the insertion of the hook members 58 of the movable plate 53 into the respective insertion holes 24a of the clamping member 24 is obtained, the piston rods 25a of the air cylinders 25 are extended, so that the latter are engaged with the catching recesses 59 of the hook members 58. As a result, a clamping of the movable plate 53 with respect to the rear housing 21 is occurred, so that a movement of the movable plate 53 is constrained in the die opening/closing directions A1 and A2.

Figure 8:
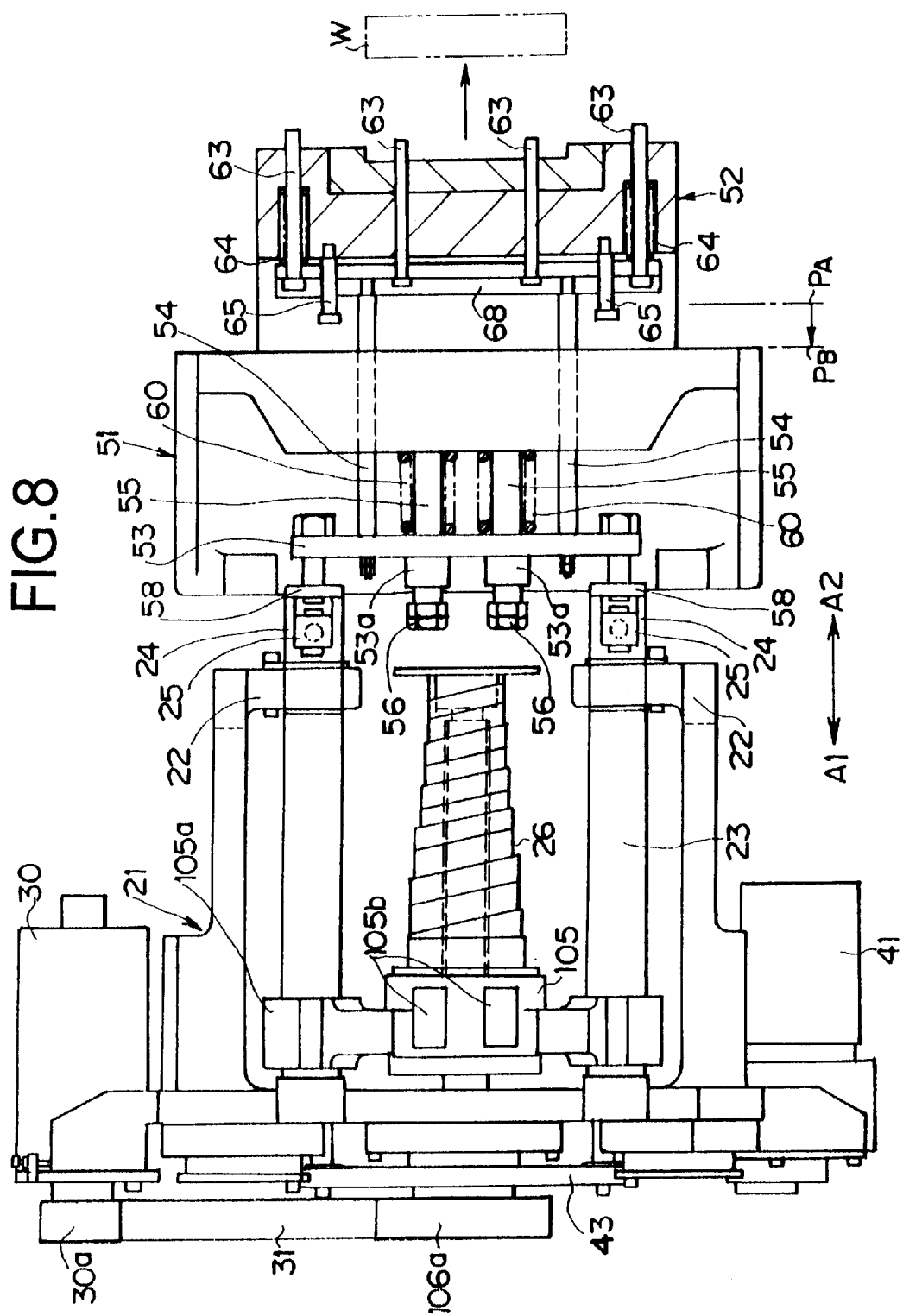
FIG. 8 is the same as to FIG. 3 except that the moving die plate 51 is moved, from the die opening limit position PA, to a pushing-out position PB.

Next, from the above mentioned die opening limit position A, the cross head 105 is further moved in the die opening limit direction A, so that the moving die plate 51 is moved to the pushing-out position PA in the die opening direction A1. In FIG. 9, the moving die plate 51 is, in its top half part, shown in the pushing-out position PB. In this pushing-out position, the movable plate 53 is constrained by the link housing 21, so that any movement of the movable plate 53 is prevented even in a situation where a further movement of the moving die plate 51 in the die opening direction A1 is obtained. In other words, a relative movement is obtained between the moving die plate 21 and the movable plate 53 in the die opening or closing direction A1 or A2. Upon such a relative movement between the moving die plate 51 and the movable plate 53, a compression of the coil springs 60 occurs. Furthermore, in FIG. 8, due to the fact that only the movement of the movable plate 53 in the die opening direction is limited, the pushing-out plate 68 mounted to the back side of the moving die 52 is moved toward the moving die 52 against the force of the springs 64. Such a movement of the pushing-out plate toward the moving die 52 causes the pushing-out pins 52 are projected out of the moving die 52, so that an ejection of a die-casting product W in the moving die 52 is occurred. As a result, a removal of a die-casting product from the die set is completed.

From the above condition, a direction of a rotating movement of the clamping servomotor 30 is, then, reversed, so that the moving die plate 51 is moved from the pushing-out position PB to the die opening limit position PA. During the movement, the constrained condition of the movable plate 53 with respect to the link housing 21 is maintained.

When the moving die plate is moved to the die opening limit position PA as shown in FIG. 7, the movable plate 53 is contacted with the stoppers 56 at the ends of the guide rods 55 and is returned to the home position to the moving die plate 51. In this position the pushing-out pins 63 are positively retracted from the die surface of the moving die 52 while the compressed coil springs 60 are returned. In this condition, the movable plate 53 is constrained to the die plate 51 and the movable plate 53 is in the home position with respect to the moving die plate 51. As a result, the movement of the moving die, plate 51 in the die closing direction A2 is prevented. In other words, during the die opening condition, the moving die plate 51 is prevented in the movement in the die closing direction A2 until the clamping is released by the air cylinders 25. Thus, even in a situation that the die clamping servomotor 30 is erroneously operated, any movement of the moving die plate 51 in the die closing direction A2 does not occur.

In order to allow a die clamping to be re-started, a die clamping signal to a control device of the die clamping apparatus 1 is detected, which allows the air cylinders 25 to be operated, so that the piston rods 25a are retracted with respect to the hook members 58, thereby canceling the clamping operation of the movable plate 53.

According to the above embodiment of the die clamping apparatus, any actuator for executing a pushing-out operation can be eliminated. Namely, a pushing out operation of a die-casting product from the moving die 52 can be done in relation to the opening/closing operation of the moving die plate.

Furthermore, according to the embodiment of the die clamping apparatus 1, the constrained condition of the movable plate 53 is maintained during period which commences when the moving die plate 51 is moved to the die opening limit position PA in the die opening direction A1, followed by a movement to the pushing-out position PB for an execution of a pushing-out operation of a die-casting product from the moving die 52 and which ceases when the moving die plate 52 is returned to the die opening limit position PA in the die closing direction A2. Therefore, when the die plate 51 is moved to the die opening limit position PA, a positive retraction of the pushing-out pins 63 from the die surface of the moving die 52 is obtained. In other words, in the embodiment of the present invention, the retraction of the pushing-out pins 63 after execution of the pushing-out operation is done not by a spring force of the coil springs 60 but by the movement of the die plate 51 itself. As a positive retraction of the pushing-out pins 63 to the desired position is obtained even in a situation that a desired expansion of the coil springs 60 is not obtained as originated, for example, by a solidification of molten metal to the coil springs 60.

Furthermore, according to the embodiment of the present invention, a constraint of the movable plate 53 to the link housing 21 can provide a safe guard mechanism which prevents, positively, the moving die plate 51 in the die opening limit position PA from being erroneously moved in the die closing direction A2. Thus, a reliably safe washing operation of the moving die 52 and the stationary die 92 in a die opening condition can be done with a high degree of safety and any damage to the moving die plate 52 and the stationary die plate 92 can be prevented. Furthermore, a safety mechanism and the pushing-out mechanism are integrated, which allows the total system to be simplified.

The present invention is not limited to the above explained embodiment. Namely, in the above embodiment, as an actuator for obtaining a restraining operation of the movable plate 53, an air cylinder 25 is used. However, any other suitable equivalent means such as a hydraulic cylinder, a motor or a electromagnetic solenoid can be used so long as a desired restraint operation of the movable plate 53 to the link housing can be obtained at a high response speed.

Furthermore, in the above embodiment, the coil springs 60 as an example of urging means in the claimed invention are used. However, any other construction such as those using a sucking force or a repellant force can be used for urging the movable plate 53 to the home position. Furthermore, a construction for generating a flow of compressed air directed to the movable plate 53 can be employed for causing the movable plate 53 to be urged to the home position.

Furthermore, in the above described embodiment, a plurality of the air cylinders 24 as well as a plurality of hook members 58 are used for obtaining a desired clamping force as well as a evenly balanced force. However, a single use of these parts can also be possible.

Finally, in the above explained embodiment, the air cylinders 25 and the clamping members 24 are arranged on the link housing 21, while the hook members 59 are arranged on the movable plate 53. However, as an alternative, a reversed construction may also be employed, wherein the air cylinders 25 and the clamping members 24 are arranged on the movable plate 53, while the hook members 59 are arranged on the link housing 21.

Second Embodiment

Figure 10:
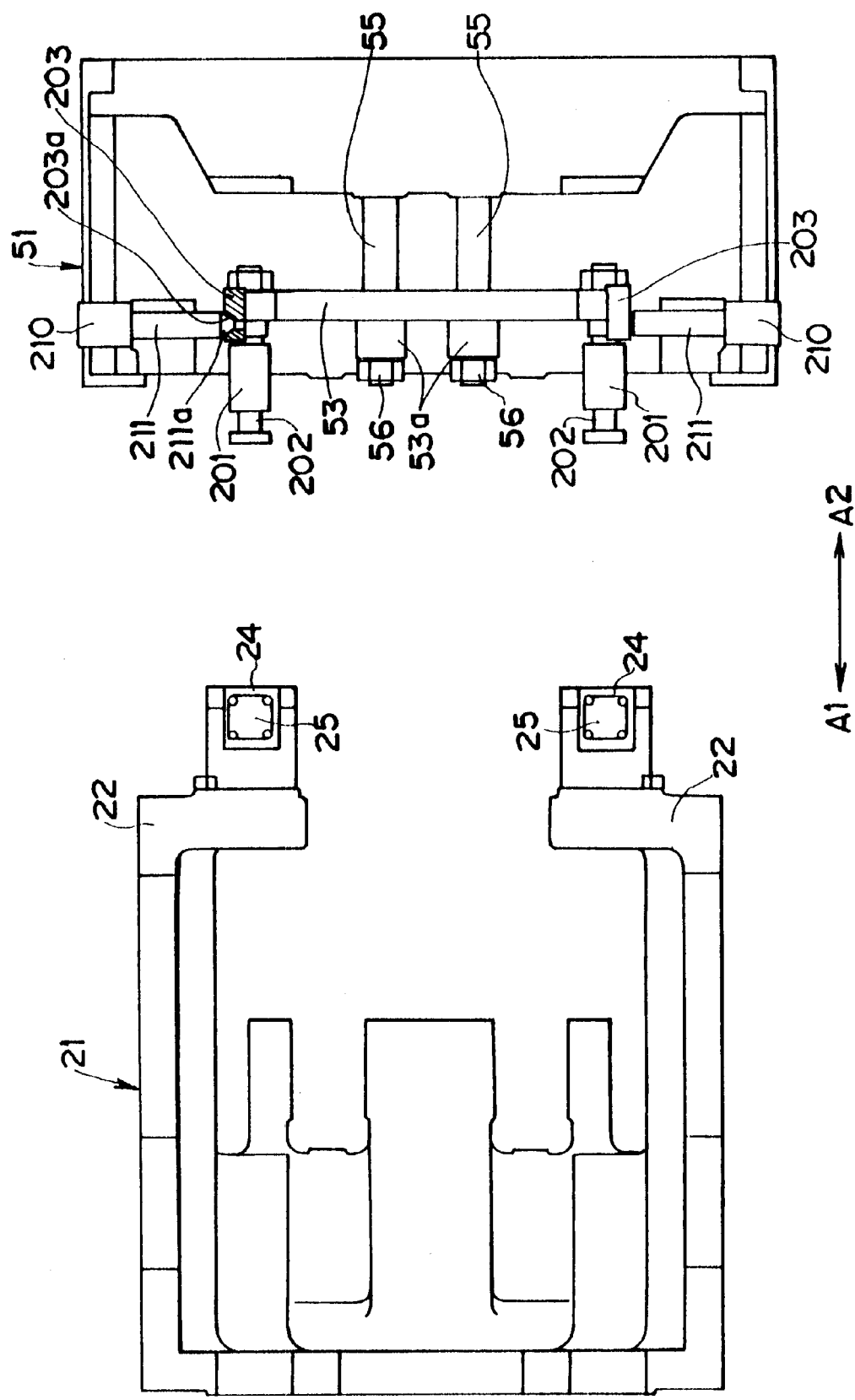
FIG. 10 illustrates a plan view of second embodiment of the present invention in which a construction around the link housing and the moving die plate is shown.

FIG. 10 illustrates a construction of a die clamping apparatus around link housing and a moving die plate in second embodiment of the present invention.

The difference of the second embodiment over the first embodiment reside only in a partial construction of the moving die plate 51 and the remaining construction is the same. Thus the parts of the same function are illustrated by the same reference numbers.

In FIG. 10, a link housing 21 is shown, which has supporting parts 22, which are, at their ends, provided with clamp members 24 and air cylinders 25, which construct constraining means according to the claimed invention.

The moving die plate 51 is provided with a movable plate 53, which is capable of moved along a die opening or closing direction A1 or A2. In FIG. 10, the movable plate 53 is shown at its home position contacting with stoppers 56.

The movable plate 53 is, at its side facing the link housing 21, provided with a plurality of hook members 201. Each of the hook members 201 is, at its end, formed with a recess 202 to which a piston rod 25a of the corresponding air cylinder 25 is engaged. The hook member 201 is of a slightly different shape as that of the hook member 58 in the first embodiment but functions in the same way.

Furthermore, catching members 203 are arranged on the respective sides of the movable plate 53. The catching member 203 is, at its outer side, formed with a catching recess 203a.

Air cylinders 210 are arranged on the respective sides of the movable plate 53 at locations opposite the catching members 203 of the movable plate when the latter is in its home position. The air cylinder 210 is provided therein with a piston rod 211 having an end 211a, which is able to engage with the catching recess 203a of the catching member 203 when the piston rod 211 is extended out of the air cylinder 210. When the tip end 211a of the piston rod 211 is engaged with the catching recess 203a of the catching member 203, a constraint of the movement of the movable plate 53 is obtained, i.e., any movement of the movable plate 53 from the home position is prevented. In other words, the movable plate 53 can not be moved with respect to the moving die plate 51 in the die opening/closing directions A1 and A2.

Now, the operation of the die clamping apparatus of this embodiment will be explained.

The die clamping apparatus in FIG. 10 is under a die clamping position where the stationary die 92 and the moving die 52 are clamped and the moving die is under the home position. In this condition, the air cylinder 210 is operated, so that the piston rod 211 is extended, thereby causing the movable plate 53 to be constrained to the moving die plate 51.

Figure 11:
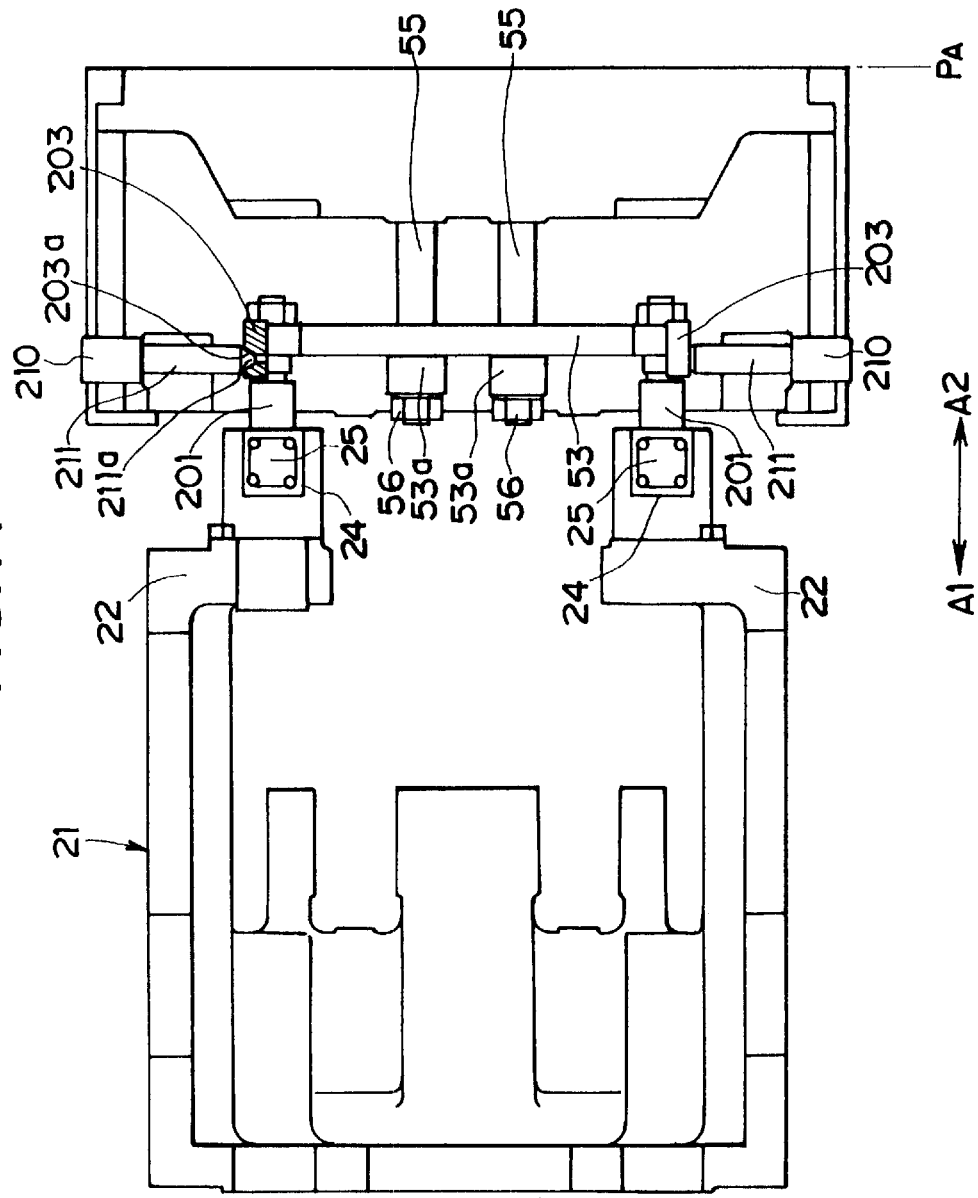
FIG. 11 is the same with FIG. 10, but for illustrating an operation.

From this condition, the moving die plate 51 is, as similar to the first embodiment, moved in the die opening direction. When the movement of the moving die plate 51 to the die opening limit position PA as shown in FIG. 11 is obtained, the end of the hook member 201 is inserted to the insertion hole 24a of the clamping member 24. In this condition, the air cylinder 25 is operated, so that piston rod of the air cylinder 25 is engaged with the catching recess 202 of the hook member 201, which causes the movable plate 53 to be constrained to the link housing 21.

Figure 12:
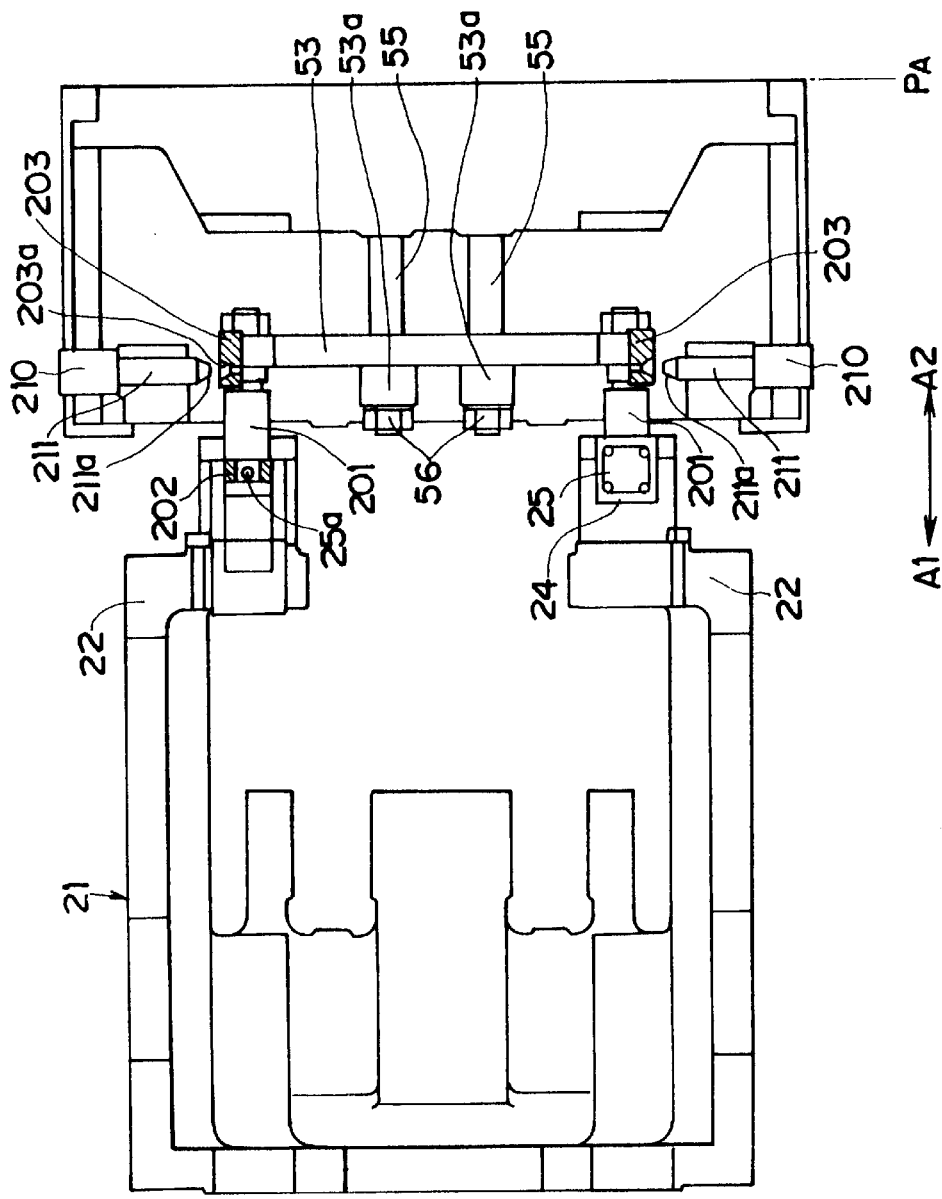
FIG. 12 illustrates a phase of the operation, which follows the phase in FIG. 11.

After the constrained state of the movable plate 53 with respect to the link housing 21, the piston rod 211 of the air cylinder 210 is retracted as shown in FIG. 12, so that the constraint of the movable plate 53 with respect to the moving die plate 51 is released. As a result, the movable plate 53 is now able to be moved with respect to the moving die plate 51.

Figure 13:
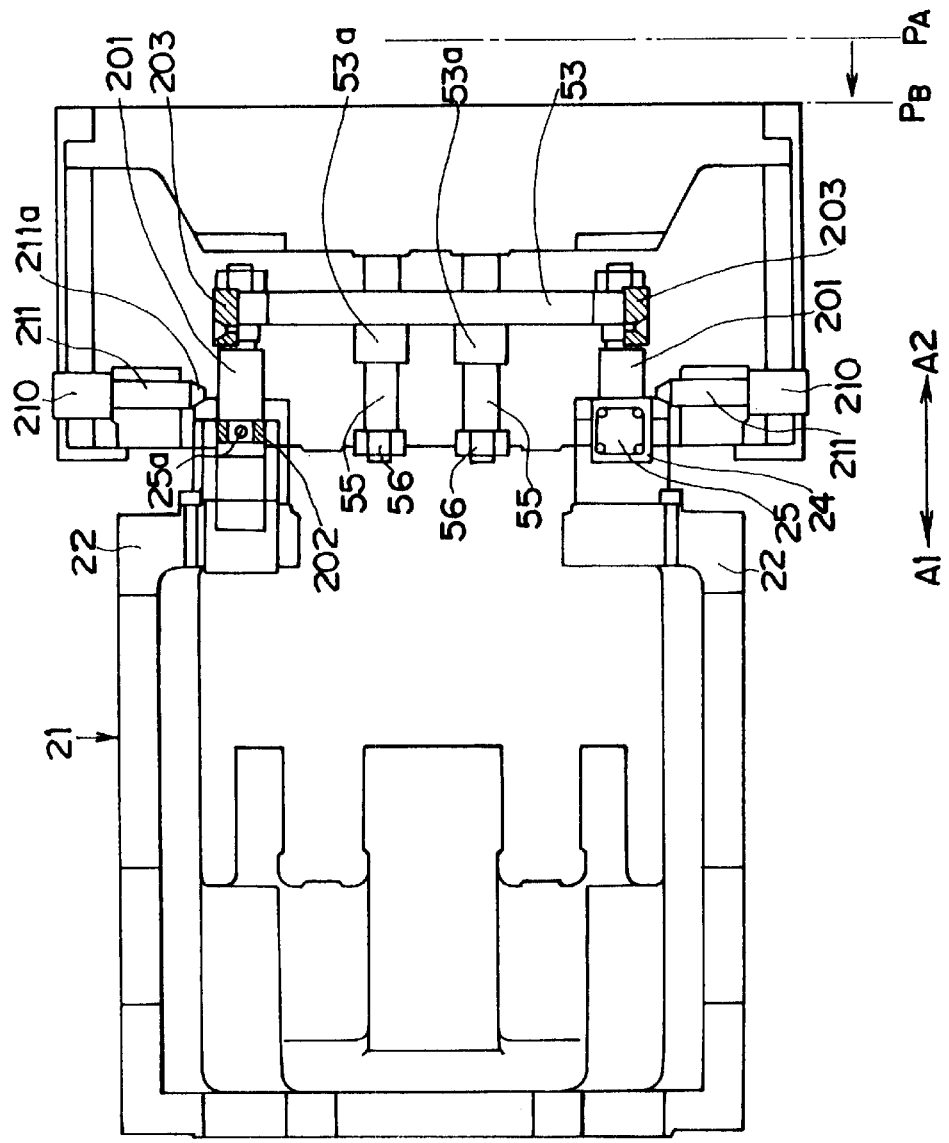
FIG. 13 illustrates a phase of the operation, which follows the phase in FIG. 12.
Figure 14:
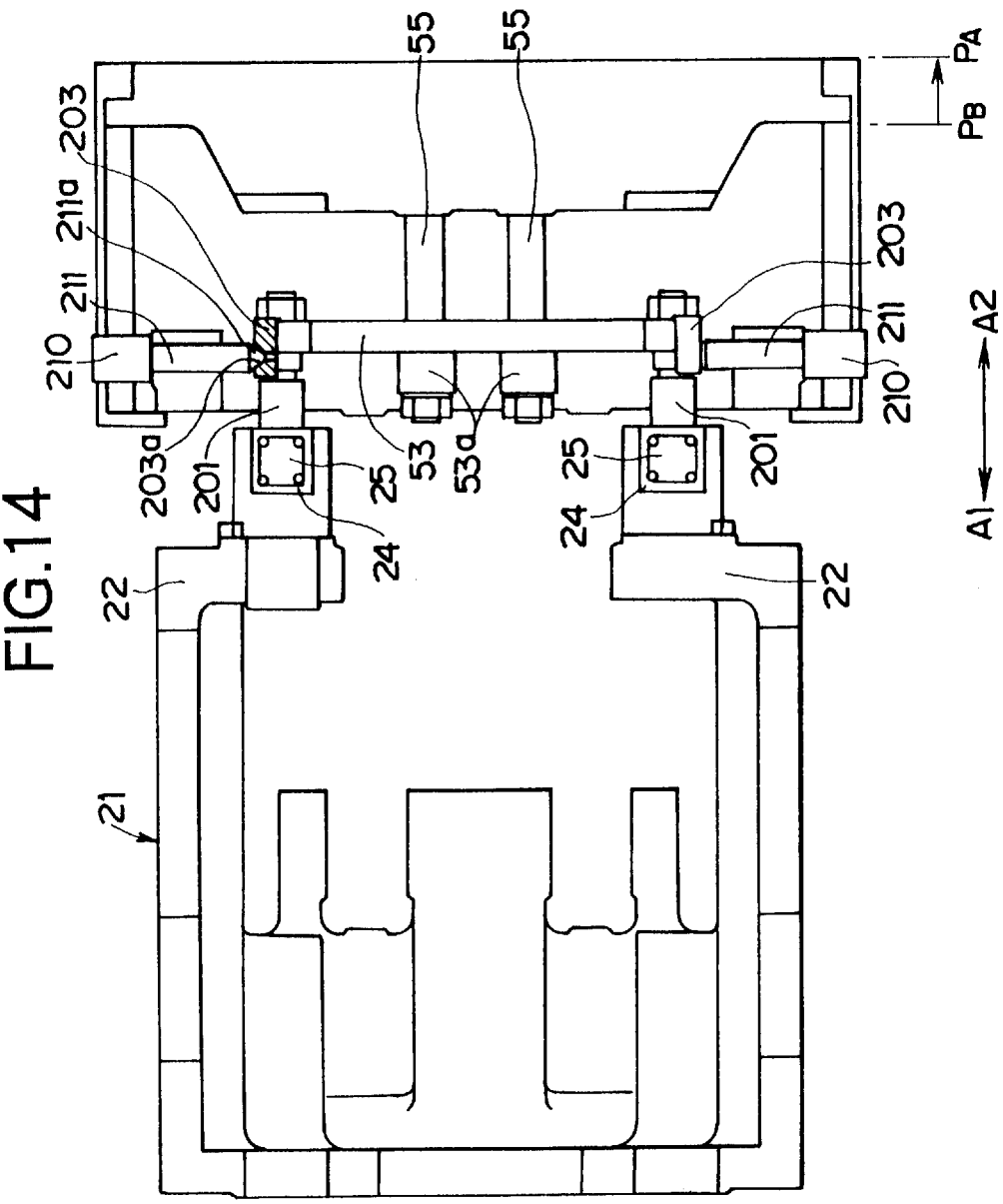
FIG. 14 illustrates a phase of the operation, which follows the phase in FIG. 13.

Then, a further movement of the moving die plate 51 in the die opening direction A1 is obtained from the die opening limit position PA to the pushing-out position PB as shown in FIG. 13. As a result, a relative movement of the movable plate 53 with respect to the die plate 51 is obtained in the die opening direction A1, so that the pushing out operation of the die-casting product by means of the pushing pins is obtained. In this condition the movable plate 53 is offset with respect to the home position of the moving die plate 51.

Upon the completion of the pushing-out operation of the die-casting product, the moving die plate 51 is, again, moved to the die opening limit position PA, which causes the movable plate 53 to be returned to the home position of the moving die plate 51. Furthermore, a positive retraction of the pushing-out pins from the inner die surface of the moving die 52 is obtained. Then, the air cylinder 210 is again operated so that its piston rod 211 is extended, thereby constraining the movable member to the moving die plate 51. In this condition, the movable plate 53 is constrained to the link housing 21 and is in the home position to the moving die plate 51. Thus, the moving die plate 51 is prevented from being moved in the die closing direction A2. Namely, in the die opening condition where a die closing operation is not done, the moving die plate 51 is prevented from being moved in the die closing direction A2 until a release of the clamping operation by the air cylinders 25. Thus, irrespective of an erroneous operation of the die closing servomotor 30, the moving die plate 51 is prevented from being moved to the die closing direction A2.

In order to cause the die clamping operation to be restarted from the above condition, a die closing signal to the control device of the die clamping apparatus 1 is detected, which causes the air cylinders 25 to be operated, so that the piston rods 25a are retracted into the block members 58, thereby releasing the clamping operation. However, the constraint of the movable plate 53 by the air cylinders 210 are maintained. Thus, a positive constraint of the movable plate 53 to the home position is obtained until a commencement of the following pushing-out operation.

As described above, according to the second embodiment of the present invention, a clamping of the movable plate 53 is always done except when the relative movement of the movable plate 53 with respect to the moving die plate 51 is necessary. Thus, a positive retraction of the pushing-out pins 63 from the die inner surface of the moving die 52 is obtained, thereby controlling positively the position of the pushing-out pins 63.

Furthermore, according to this embodiment of the present invention, the same mechanism can attain a safety function as well as pushing-out function. Thus, a simplified construction is obtained.

The present invention is not limited to the above explained embodiments.

In the above embodiments, as actuators, the air cylinders 25 and 210 are used. However, as an alternative, actuators of an increased response speed such as hydraulic cylinders or an electric motor or electromagnetic solenoid of an increased force can be used.

In the above embodiments, a plurality of air cylinders 210 are used. However, a modification is possible, wherein a single use of such an air cylinder is done.

Furthermore, in the above embodiments, the air cylinders 25 and 210 are separately provided. However, a modification is possible where both of the air cylinders are combined. Namely, in FIG. 15A, the movable plate 53 is provided with an air cylinder 301 having piston rod 302 which is able to extract on both sides. The moving die plate 51 is formed with a recess 304 with which the piston rod 302 of the air cylinder 301 is engageable. The link housing 21 is formed with an engaging member 305 having an engaging recess 305a, with which the piston rod 302 of the air cylinder is engageable.

Figure 15A:
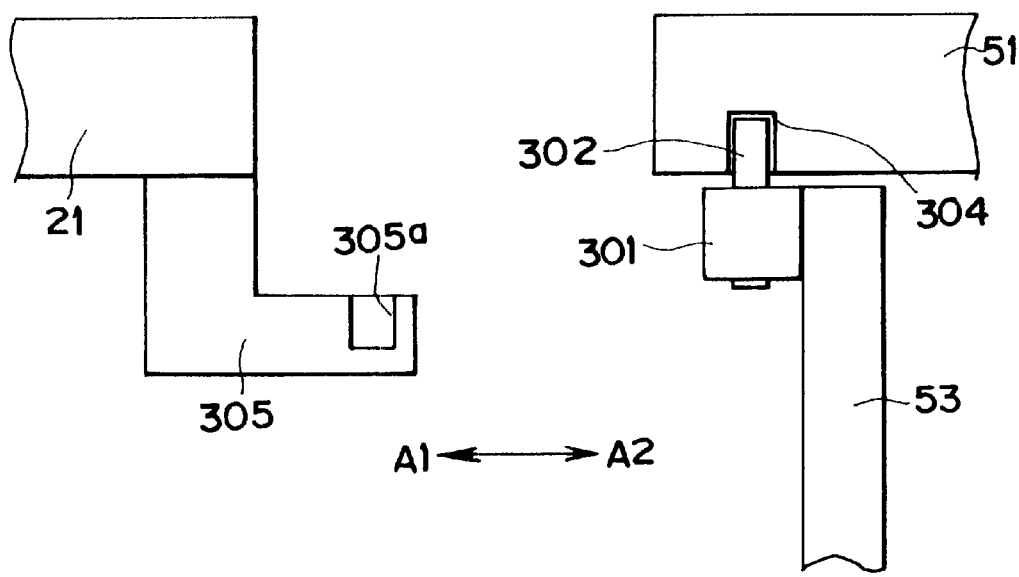
FIG. 15A illustrates a modification directed a integrated constraining device when it is under a condition where the movable plate is connected to the moving die plate.

FIG. 15A illustrates a die clamping condition where the air cylinder 301 can obtain a clamping operation of a movable plate 52 to the moving die plate 41 at its home position.

Figure 15B:
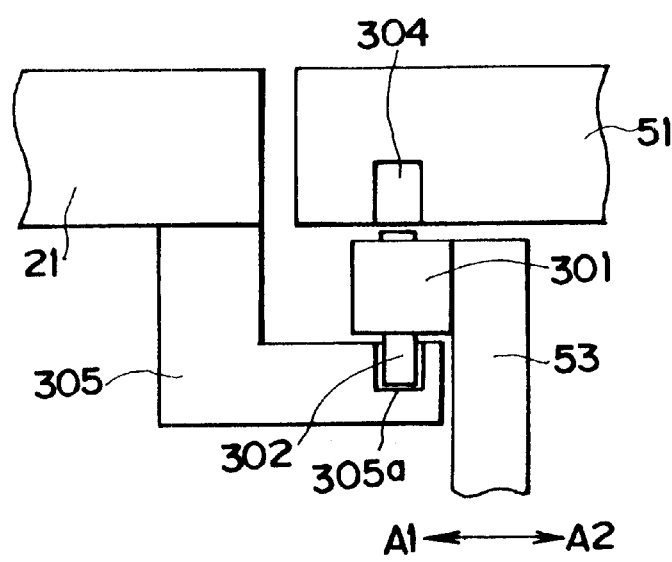
FIG. 15B illustrates the integrated constraining device when it is under a condition where the movable plate is connected to the link housing.

When the moving die plate 51 is moved to a die opening limit position as shown in FIG. 15B, the piston rod 302 of the air cylinder is projected at the opposite side for obtaining an engagement with the engaging member 305, thereby obtaining the constrained condition of the movable plate 53 with respect to the housing 21. Simultaneously, the constraint of the movable plate 53 with respect to the moving die plate 51 is released. As a result of such a possibility of a selected operation between the constraint of a movement of the movable plate 53 from the home position of the moving die plate and the constraint of a movement of the movable plate moved to the die opening limit position in the die opening/closing direction, a reduction in the number of the air cylinders is obtained, resulting in a reduction in a production cost.

Furthermore, in the above embodiment, the clamp members 24 are fixed to the supporting parts 22 of the link housing 21 and the hook parts 58 are fixed to the movable plate 53, so it is impossible to change the pushing-out position of a die-casting product. For example, by mounting the clamp members 24 movably to the supporting parts 22 and/or by mounting the hook parts 58 movably to the movable plate 53, it becomes possible to change the pushing-out position of a die-casting product.

The above explanation of the embodiments are directed to an application of the idea of the present invention to a die-casting machine. However, the present invention is not limited to the die-casting machine and is applicable to other field such as a plastic injection machine.

In the above explanation, a toggle mechanism is used for operating the moving die plate. However, the idea of the present invention is also applicable to a die clamping apparatus of directly pressuring type.

As advantages of the present invention, a reliable operation of the pushing-out pin in relation to the opening and closing operation of the die can be obtained.

Furthermore, a more simplified construction of the die clamping apparatus is obtained, resulting in a reduction in the cost.

What is claimed is:

1. A die clamping apparatus:

a stationary die;

a stationary die plate on which the stationary die is held;

a moving die;

a moving die plate on which the moving die is held while the moving die being faced with the stationary die;

die clamping means for selectively opening and closing the dies as well as for clamping the dies;

at least one pushing-out pin selectively projected from and retracted to the moving die;

a movable member connected to said pushing-out pin and arranged movably with respect to the moving die plate, and;

means for constraining the movement of said movable member in the die opening and closing directions when said movable member is moved to a predetermined die opening position, such that, with respect to the moving die plate moved further in the die opening direction from said predetermined die opening position or moved in the die closing direction toward the die opening position, only the movement of the movable member is constrained by said constraining means.

2. A die clamping apparatus:

a stationary die;

a stationary die plate on which the stationary die is held;

a moving die;

a moving die plate on which the moving die is held while the moving die being faced with the stationary die;

die clamping means for selectively opening and closing the dies as well as for clamping the dies;

at least one pushing-out pin selectively projected from and retracted to the moving die;

a movable member connected to said pushing-out pin and arranged movably with respect to the moving die plate;

means for constraining the movement of said movable member in the die opening and closing directions when said movable member is moved to a predetermined die opening position, such that, with respect to the moving die plate moved further in the die opening direction from said predetermined die opening position, only the movement of the movable member is constrained by said constraining means, thereby generating a resultant relative movement between the movable member and the moving die plate, so that the pushing-out pin is projected from the moving die, which causes a molded product to be pushed out from the moving die, and;

means for preventing the moving die plate from being moved at least in the forward direction from said die opening position after the completion of the pushing-out operation for a separation of a molded product so long as the constraining operation by the constraining means is maintained.

3. A die clamping apparatus according to claim 2, further comprising urging means for urging the movable member toward the home position with respect to the moving die plate, wherein the pushing-out pin is retracted from the moving die.

4. A die clamping apparatus according to claim 1, wherein said die clamping means comprises a link housing and drive means arranged between the link housing and the moving die plate for generating a die clamping force, and wherein said constraining means constrains the movable member with respect to said to the link housing.

5. A die clamping apparatus according to claim 4, wherein said constraining means comprises an actuator on one of the link housing and the moving die plate, the actuator being for causing the link housing and the moving die plate to be engaged with each other.

6. A die clamping apparatus:

a stationary die;

a stationary die plate on which the stationary die is held;

a moving die;

a moving die plate on which the moving die is held while the moving die being faced with the stationary die;

die clamping means for selectively opening and closing the dies as well as for clamping the dies;

at least one pushing-out pin selectively projected from and retracted to the moving die;

a movable member connected to said pushing-out pin and arranged movably with respect to the moving die plate;

urging means for urging the movable member with respect to the moving die plate movable so that a position is obtained, wherein the pushing-out pin is held in positions retracted into the moving die plate, and;

means for constraining the movement of said movable member in the die opening and closing directions when said movable member is moved to a predetermined die opening position, such that, with respect to the moving die plate moved further in the die opening direction from said predetermined die opening position, only the movement of the movable plate is constrained by said constraining means, so that a resultant relative movement between the movable member and the moving die plate causes the pushing-out pin to be projected from the moving die, which causes a molded product to be pushed out, while the constraint of the movable member being kept until the moving die plate is returned to said die opening position.

7. A die clamping apparatus according to claim 6, wherein said die clamping means comprises a link housing and drive means arranged between the link housing and the moving die plate for generating a die clamping force.

8. A die clamping apparatus according to claim 6, further comprising means for preventing the moving die plate from being moved at least in the forward direction from said die opening position so long as the constraining means is operated.

9. A die clamping apparatus according to claim 7, wherein said constraining means comprises an engaging member on one of the link housing and the moving die plate and actuating means for causing the engaging member to be selectively engaged with the other of the link housing and the moving die plate.

10. A die clamping apparatus:

a stationary die;

a stationary die plate on which the stationary die is held;

a moving die;

a moving die plate on which the moving die is held while the moving die being faced with the stationary die;

die clamping means for selectively opening and closing the dies as well as for clamping the dies;

at least one pushing-out pin selectively projected from and retracted to the moving die;

a movable member connected to said pushing-out pin and arranged movably with respect to the moving die plate;

first constraining means for preventing the moving die plate from being moved from a home position with respect to the movable member;

second constraining means for preventing said movable member from being moved in the die opening and closing directions when said movable member is moved to a predetermined die opening position;

the arrangement of said first and second constraining means being such that, with respect to the moving die plate moved further in the die opening direction from said predetermined die opening position, only the movement of the movable plate is constrained by said second constraining means, so that a resultant relative movement between the movable member and the moving die plate causes the pushing-out pin to be projected from the moving die, which causes a molded product to be pushed out and such that, except for a condition where said relative movement is to be obtained, the movable member is always constrained by said first constraining means.

11. A die clamping apparatus according to claim 10, wherein said die clamping means comprises a link housing and drive means arranged between the link housing and the moving die plate for generating a die clamping force, and wherein said second constraining means constrains the movable member with respect to said link housing.

12. A die clamping apparatus according to claim 10, further comprising means for preventing the moving die plate from being moved in the forward direction from the die opening position so long as the constraining operation by said second constraining means is not released.

13. A die clamping apparatus according to claim 10, wherein said first and second constraining means are integrated such that a selective operation is obtained between the constraint of the movable member from the home position with respect to the moving die plate and the constraint of the movable member to the die opening and closing direction after the movement to the predetermined die opening position is obtained.

14. A die clamping apparatus according to claim 11, wherein the first constraining means are arranged on one of the moving die plate and the movable member and having an actuator for causing the moving die plate and the movable member to be engaged with each other, and wherein said second constraining means are arranged on one of the link housing and the moving die plate and having an actuator for causing the link housing and the moving die plate to be engaged with each other.

* * * * *